(12) United States Patent
Shi et al.

(10) Patent No.: US 11,866,591 B2
(45) Date of Patent: Jan. 9, 2024

(54) CELLULOSE DERIVATIVE BASED BIODEGRADABLE SUPPORT STRUCTURES FOR 3D PRINTING

(71) Applicant: Iowa State University Research Foundation, Inc., Ames, IA (US)

(72) Inventors: Xiaolei Shi, Ames, IA (US); Hantang Qin, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 233 days.

(21) Appl. No.: 17/301,695

(22) Filed: Apr. 12, 2021

(65) Prior Publication Data

US 2021/0317328 A1    Oct. 14, 2021

Related U.S. Application Data

(60) Provisional application No. 63/008,058, filed on Apr. 10, 2020.

(51) Int. Cl.
| | | |
|---|---|---|
| C09D 101/28 | (2006.01) | |
| B33Y 70/00 | (2020.01) | |
| B29C 64/40 | (2017.01) | |
| B29C 64/118 | (2017.01) | |
| B29K 1/00 | (2006.01) | |

(52) U.S. Cl.
CPC ........ C09D 101/284 (2013.01); B29C 64/118 (2017.08); B29C 64/40 (2017.08); B33Y 70/00 (2014.12); B29K 2001/08 (2013.01); B29K 2995/006 (2013.01); B29K 2995/0062 (2013.01)

(58) Field of Classification Search
None
See application file for complete search history.

(56) References Cited

U.S. PATENT DOCUMENTS

| | | |
|---|---|---|
| 6,790,403 B1 | 9/2004 | Priedeman, Jr. et al. |
| 6,863,859 B2 | 3/2005 | Levy |
| 2018/0147785 A1 | 5/2018 | Bayer et al. |

OTHER PUBLICATIONS

Ahlfeld et al, "A Methylcellulose Hydrogel as Support for 3D Plotting of Complex Shaped Calcium Phosphate Scaffolds," Gels, vol. 4, Issue 3 (Year: 2018).*
Kadry et al, "Multi-purposable filaments of HPMC for 3D printing of medications with tailored drug release and timed-absorption," published Apr. 20, 2018, International Journal of Pharmaceuticals 544, pp. 285-296 (Year: 2018).*
Akhoundi et al., "Effect of Filling Pattern on the Tensile and Flexural Mechanical Properties of FDM 3D Printed Products", Experimental Mechanics, vol. 59, pp. 883-897, 2019.

(Continued)

*Primary Examiner* — Colin W. Slifka
(74) *Attorney, Agent, or Firm* — McKee, Voorhees & Sease, PLC (57) ABSTRACT

The present disclosure relates to support structures for three dimensional (3D) printing, methods of preparing the support structures, and methods of using the support structures. In particular, the support structures comprise a hydrogel comprised of a cellulose derivative. Preferably, the support structures are biodegradable and easily removed without generating toxic waste.

18 Claims, 6 Drawing Sheets

(56) References Cited

OTHER PUBLICATIONS

Ali et al., "Evaluation of Cross-Linked Hydroxypropyl Methylcellulose Graft-Methacrylic Acid Copolymer as Extended Release Oral Drug Carrier ", Cellulose Chem. Technol., vol. 49, No. 2, pp. 143-151, 2015.

Banks et al., "The influence of substituted phenols on the sol gel transition of hydroxypropyl methylcellulose (HPMC) aqueous solutions", Carbohydrate Polymers, vol. 101, pp. 1198-1204, 2014.

Baran et al., "Surface Modification of 3D Printed PLA Objects by Fused Deposition Modeling: A Review ", Colloids Interfaces, vol. 3, No. 43, pp. 1-25, doi:10.3390/colloids3020043, 2019.

Cloitre et al., "Delayed-die swell and sedimentation of elongated particles in wormlike micellar solutions1", J. Non-Newtonian Fluid Mech., vol. 79, pp. 157-171, 1998.

Cochis et al., "3D Printing of Thermo-Responsive Methylcellulose Hydrogels for Cell-Sheet Engineering", Materials, vol. 11, No. 579, pp. 1-14, doi:10.3390/ma11040579, 2018.

Contessi Negrini et al., "3D printing of methylcellulose-based hydrogels", https://doi.org/10.1016/j.bprint.2018. e00024, 2018.

Ding et al., "Rheological Properties of Collagen/Hydroxypropyl Methylcellulose (COL/HPMC) Blended Solutions", Journal of Applied Polymer Science, DOI: 10.1002/APP.40042, 2014.

Edelby et al., "Flow and Sol-Gel Behavior of Two Types of Methylcellulose at Various Concentrations ", AIP Conference Proceedings, 1593, pp. 750-754, https://doi.org/10.1063/1.4873885, 2014.

Fafenrot et al., "Three-Dimensional (3D) Printing of Polymer-Metal Hybrid Materials by Fused Deposition Modeling", Materials, vol. 10, No. 1199, pp. 1-14, Oct. 19, 2017.

Gao et al., "Optimization of gelatin-alginate composite bioink printability using rheological parameters: a systematic approach", Biofabrication, vol. 10, 034106, https://doi.org/10.1088/1758-5090/aacdc?, 2018.

Gebhardt, Andreas, "Rapid Prototyping", Hanser Gardner Publications, pp. 1-240, 2003.

De Graef et al., "Chocolate yield stress as measured by oscillatory rheology", Food Research International, vol. 44, pp. 2660-2665, 2011.

Gunasekaran et al., "Dynamic oscillatory shear testing of foods-selected applications", Trends in Food Science & Technology, vol. 11, pp. 115-127, 2000.

Hamilton et al., "3D printing Vegemite and Marmite: Redefining 'breadboards'", Journal of Food Engineering, vol. 220, pp. 83-88, 2018.

Jiang et al., "Support Structures for Additive Manufacturing: A Review", J. Manuf. Mater. Process., vol. 2, No. 64, pp. 1-23, doi:10.3390/jmmp2040064, 2018.

Joshi, Sunil, "Sol-Gel Behavior of Hydroxypropyl Methylcellulose (HPMC) in Ionic Media Including Drug Release", Materials, vol. 4, pp. 1861-1905, doi:10.3390/ma4101861, 2011.

Kadry et al., "Multi-purposable filaments of HPMC for 3D printing of medications with tailored drug release and timed-absorption", International Journal of Pharmaceutics, vol. 544, pp. 285-296, 2018.

Kapur et al., "Yield Stress of Suspensions Loaded with Size Distributed Particles", AIChE Journal, vol. 43, No. 5, pp. 1171-1179, May 1997.

Khaled et al., "3D Printing of tablets containing multiple drugs with defined release profiles", International Journal of Pharmaceutics, http://dx.doi.org/10.1016/j.ijpharm.2015.07.067, 2015.

Lavanya et al., "Sources of Cellulose and Their Applications—A Review", International Journal of Drug Formulation and Research, vol. 2, Issue 6, pp. 19-38, 2011.

Li et al., "Thermal Decomposition of Cellulose Ethers", Journal of Applied Polymer, vol. 73, Issue 14, pp. 2927-2936, 1999.

Liu et al., "3D printing: Printing precision and application in food sector", Trends in Food Science & Technology, vol. 69, pp. 83-94, 2017.

Liu et al., "Impact of rheological properties of mashed potatoes on 3D printing", Journal of Food Engineering, vol. 220, pp. 76-82, 2018.

Luo et al., "Biodegradation Assessment of Poly (Lactic Acid) Filled with Functionalized Titania Nanoparticles (PLA/TiO2) under Compost Conditions", Nanoscale Research Letters, vol. 14, No. 56, https://doi.org/10.1186/s11671-019-2891-4, 2019.

Panda et al., "Experimental study on mix proportion and fresh properties of fly ash based geopolymer for 3D concrete printing", Ceramics International, vol. 44, pp. 10258-10265, 2018.

Park et al., "Enhanced Solubility of the Support in an FDM-Based 3D Printed Structure Using Hydrogen Peroxide under Ultrasonication", Advances in Materials Science and Engineering, vol. 218, Article ID 3018761, pp. 1-10, https://doi.org/ 10.1155/2018/3018761 , 2018.

Polamaplly et al., "3D Printing and Characterization of Hydroxypropyl Methylcellulose and Methylcellulose for Biodegradable Support Structures", Procedia Manufacturing, vol. 34, pp. 552-559, 2019.

Polamaplly et al., "3D printing and characterization of hydroxypropyl methylcellulose and methylcellulose for biodegradable support structures", Polymer, vol. 173, pp. 119-126, 2019.

Ranganathan et al., "Synthesis and Properties of Hydrogels Prepared by Various Polymerization Reaction Systems", Cellulose-Based Superabsorbent Hydrogels, pp. 1-25, https://doi.org/10.1007/978-3-319-76573-0_18-1, 2018.

Rao, Anandha, "Rheology of Fluid, Semisolid, and Solid Foods", Principles and Applications, Third Edition, DOI 10.1007/978-1-4614-9230-6 , 2014.

Ribeiro, et al., "Assessing bioink shape fidelity to aid material development in 3D bioprinting", Biofabrication, vol. 10, 014102, https://doi.org/10.1088/1758-5090/aa90e2, 2018.

Rudraraju et al, "Rheology of Microcrystalline Cellulose and Sodiumcarboxymethyl Cellulose hydrogels using a controlled stress rheometer: part II", International Journal of Pharmaceutics , vol. 292, pp. 63-73, 2005.

Sanandiya et al., "Large-scale additive manufacturing with bioinspired cellulosic materials", Scientific Reports, vol. 8, No. 8642, pp. 1-9, 2018.

Sarkar, N., "Thermal Gelation Properties of Methyl and Hydroxypropyl Methylcellulose", Journal of Applied Polymer Science, vol. 24, pp. 1073-1087, 1979.

Stansbury et al., "3D printing with polymers: Challenges among expanding options and opportunities", Dental Materials, vol. 32, pp. 54-64, 2016.

Valerga et al., "Influence of PLA Filament Conditions on Characteristics of FDM Parts", Materials, vol. 11, No. 1322, pp. 1-13, doi:10.3390/ma11081322, 2018.

Wang et al., "Investigation on fish surimi gel as promising food material for 3D printing", Journal of Food Engineering, vol. 220, pp. 101-108, 2018.

Wang et al., "3D printing with cellulose materials", Cellulose, pp. 1-27, https://doi.org/10.1007/s10570-018-1888-y, 2018.

Wegrzyn et al., "Food Layered Manufacture: A new process for constructing solid foods", Trends in Food Science & Technology, vol. 27, pp. 66-72, 2012.

Wijk et al., "3D printing with biomaterials: Towards a sustainable and circular economy", pp. 1-86, DOI:10.3233/978-1-61499-486-2-i, 2015.

Wilson et al., "Shear-Thinning and Thermo-Reversible Nanoengineered Inks for 3D Bioprinting", ACS Applied Materials & Interfaces, vol. 9, pp. 43449-43458, 2017.

Yang et al., "Investigation on lemon juice gel as food material for 3D printing and optimization of printing parameters", LWT—Food Science and Technology, vol. 87, pp. 67-76, 2018.

Zhang et al., "Hydroxypropyl methylcellulose-based controlled release dosage by melt extrusion and 3D printing: Structure and drug release correlation", Carbohydrate Polymers, vol. 177, pp. 49-57, 2017.

\* cited by examiner

CELLULOSE DERIVATIVE BASED BIODEGRADABLE SUPPORT STRUCTURES FOR 3D PRINTING

CROSS-REFERENCE TO RELATED APPLICATIONS

This application claims priority under 35 U.S.C. § 119 to provisional application Ser. No. 63/008,058, filed Apr. 10, 2020, herein incorporated by reference in its entirety.

TECHNICAL FIELD

The present disclosure relates to support structures for 3D printing. Preferably, the support structures are biodegradable and easily removed without generating toxic waste.

BACKGROUND

Three-dimensional (3D) printing is an additive manufacturing technique where the 3D object fabricated by successive layers of material printed on top of the previous layer based on digital model data inputs. The advantages of 3D printing include the capability to form complex geometries, the possibility to integrate different materials through layer-by-layer modeling, speeding up product development cycles, and reducing prototyping cost. It offers a relative low-cost startup and supply chain for the production of customized printed objects.

Fused deposition modeling (FDM) and material extrusion (ME) are the two most widely used 3D printing techniques. FDM technology was developed in the early 1990s that used thermoplastic polymers as the build material, e.g., acrylonitrile butadiene styrene (ABS), nylon, polylactic acid (PLA). In some cases, the FDM system requires support structures to build a part successfully. The support structure acts as a sacrificial layer and enables the formation of cavities, hollow sections, and complex overhanging features for the build material. The support material is useful for other purposes as well, e.g., to minimize warping from the build material and/or to enable relative motion between two components. A support material can be printed with either similar deposition techniques as used in FDM for materials with high melting temperature, or with ME technique, which conducts direct extrusion of the prepared material from the paste extruder. For 3D printing of biopolymer and hydrocolloid materials as support material, the ME process is preferred due to the extrudability of such materials at ambient temperature. These biopolymer materials are typically thermoset instead of thermoplastic, which means they do not melt upon heating for extrusion like plastics, but form hydrogels with heat. The hydrogels can be prepared and filled into paste extruder and then 3D printed as it is. The support material is subsequently removed or dissolved after 3D printing of main structure is completed. The support material should be removable or be dissolvable without affecting the build material. The present support materials used in FDM system have challenges in terms of removability and sustainability. The use of pliers to remove the support structure mechanically leaves some defective burrs on the surface of the main structure. Moreover, in such a process, some amount of support material is leftover in the cavities of support structures. Another technique is heating the support material to a temperature above its melting point to remove the support material from the build material with minimum residue. In these cases, there will be an undesirable residue left on the printed three-dimensional part. Furthermore, the use of elevated temperatures to melt the support structures may affect the mechanical performance of the finished three-dimensional part resulting in part deformation or failure.

In FDM based ABS printing, polyvinyl alcohol (PVA) is commonly used as support material as it is a biodegradable material. After the main structure is printed and solidified, the support part fabricated with PVA is dissolved in a solution of isopropyl alcohol and potassium hydroxide to remove the support structures; however, it generates hazardous and toxic wastes. Another commonly used support material is high impact polystyrene (HIPS), which can be dissolved by limonene for removal after 3D printing but this process generates harmful toxic fumes. Acrylic copolymer has been applied as commercial support materials (e.g., SR series from Stratasys) to support FDM based 3D printing. However, they all have the limitations during removal. Manual mechanical removal only works for simple support structures, while bath decomposition generates hazardous bath solutions and chemical wastes that are not sustainable. Personal protective equipment, safe disposal methods according to local regulations and safe handling are required for post processing of acrylic polymer-based support materials.

SUMMARY

The present application provides methods of forming a three-dimensional object. The methods comprise printing a support structure from a support material, wherein the support material comprises a hydrogel of a cellulose derivative. In an aspect, the support structure is biodegradable. In embodiment, the cellulose derivative is water-soluble. The cellulose derivative may comprise a cellulose ether including, without limitation, methylcellulose or hydroxypropyl methylcellulose. In an aspect, the degree of substitution of hydroxyl groups of the cellulose derivative is from about 20% to about 50%. In an embodiment, the hydroxypropyl methylcellulose is HPMC K4M having about 19% to 24% methoxyl group substitutions and about 4% to 12% hydroxypropyl group substitutions. In another embodiment, the hydroxypropyl methylcellulose is HPMC E4M having about 28% to 30% methoxyl group substitutions and about 7% to 12% hydroxypropyl group substitutions. In yet another embodiment, the methylcellulose is MC A4M having about 27.5% to 31.5% methoxyl group substitutions.

In an aspect, the hydrogel comprises from 5% w/v to about 20% w/v of the cellulose derivative. Preferably, the hydrogel comprises from about 8% w/v to about 12% w/v of the cellulose derivative. According to an embodiment, the hydrogel comprises about 8% w/v, about 10% w/v, or about 12% w/v of the cellulose derivative.

In an aspect, the methods further comprise printing a main structure from a build material on the support structure. The build material may comprise any suitable material known to those of skill of in the art such as ABS or PLA. In an embodiment, the main structure is printed after completion of the support structure. In another embodiment, the support structure and main structure are printed simultaneously. In a further aspect, the methods comprise removing the main structure from the support structure by contacting the support structure with water, preferably cold water. According to an embodiment, the removing does not generate toxic waste or hazardous fumes.

In an aspect, the printing comprises use of fused deposition modeling or material extrusion. In an embodiment, the support material is dispensed through a nozzle having a diameter of from about 0.4 mm to about 1.0 mm. Preferably, the nozzle diameter is about 0.437 mm. According to an embodiment, preferred printing parameters include a printing speed of about 5 mm/s and an extrusion multiplier of about 0.125.

The present application also provides three-dimensional objects comprising a support structure formed from a support material, wherein the support material comprises a hydrogel of a cellulose derivative. In an aspect, the support structure is biodegradable. In an embodiment, the cellulose derivative is water-soluble. The cellulose derivative may comprise a cellulose ether including, without limitation, methylcellulose or hydroxypropyl methylcellulose. In an aspect, the degree of substitution of hydroxyl groups of the cellulose derivative is from about 20% to about 50%. In an embodiment, the hydroxypropyl methylcellulose is HPMC K4M having about 19% to 24% methoxyl group substitutions and about 4% to 12% hydroxypropyl group substitutions. In another embodiment, the hydroxypropyl methylcellulose is HPMC E4M having about 28% to 30% methoxyl group substitutions and about 7% to 12% hydroxypropyl group substitutions. In yet another embodiment, the methylcellulose is MC A4M having about 27.5% to 31.5% methoxyl group substitutions.

In an aspect, the hydrogel comprises from 5% w/v to about 20% w/v of the cellulose derivative. Preferably, the hydrogel comprises from about 8% w/v to about 12% w/v of the cellulose derivative. According to an embodiment, the hydrogel comprises about 8% w/v, about 10% w/v, or about 12% w/v of the cellulose derivative.

In an aspect, the three-dimensional objects further comprise a main structure formed from a build material. In another aspect, the main structure is removable from support structure by contacting the support structure with water. According to an embodiment, the removal does not generate toxic waste or hazardous fumes.

Other objects, advantages and features of this disclosure will become apparent from the following specification taken in conjunction with the accompanying figures.

BRIEF DESCRIPTION OF THE FIGURES

The following figures form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present application addresses the deficiencies and needs described above in the background. Beneficially, the present application provides a suitable biomaterial for support structures that eliminates the challenges of poor dissolvability and toxic waste generated by the conventional materials. More particularly, the present application has surprisingly found that it is possible to use biodegradable cellulose derivatives including methylcellulose and hydroxypropyl methylcellulose as support materials in 3D printing technology. The water dissolution of the methylcellulose and hydroxypropyl methylcellulose hydrogels allows easy removal of the support structures from the build material. Further, the present application has identified the effect of concentration of the cellulose derivatives on rheological properties for understanding their printability. Other challenges overcome by the present application include determining the effects of printing parameters including extrusion rate, nozzle diameter, and printing speed for obtaining the desired three-dimensional structures. Another benefit of the invention is that it provides a cost saving solution. Cost of the cellulose derivative is approximately $6 dollars/lb, and each pound of the powder makes about 10 lb of the hydrogel for 3D printing of supportive materials.

The embodiments of this invention are not limited to the particular embodiments illustrated as examples herein, which can vary. Other objects, advantages and features of the present invention will become apparent from the following description taken in conjunction with the accompanying drawings.

DEFINITIONS

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation. The preferred materials and methods are described herein. In describing and claiming the embodiments of the present invention, the following terminology will be used in accordance with the definitions set out below.

For example, as used in this specification and the appended claims, the singular forms "a," "an" and "the" can include plural referents unless the content clearly indicates otherwise. Similarly, the word "or" is intended to include "and" unless the context clearly indicate otherwise. The word "or" means any one member of a particular list and also includes any combination of members of that list. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring techniques and equipment, with respect to any quantifiable variable, including, but not limited to, mass, volume, time, temperature, length, viscosity, shear rate, etc. Further, given typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Cellulose Derivatives

Cellulose is one of the most commonly used natural polymers on the planet. Typically, the major industrial source of cellulose is obtained from plants such as refined cotton with an alkaline treatment. The cellulose derivatives such as methylcellulose (MC) and hydroxypropyl methylcellulose (HPMC) can be derived from cellulose by different processes such as oxidation, micronization, etherification and esterification. Cellulose is hydrophilic but as it has many hydroxyl groups that form hydrogen bonds, the intramolecular hydrogen bonding prevents it from being dissolved in water. When the hydroxyl groups of cellulose structure are modified by methoxyl groups and/or hydroxypropyl groups, the derived semi-synthesized cellulose derivatives become water-soluble. MC is the simplest cellulose derivative and HPMC is a nonionic cellulose derivative material. Cellulose ethers exhibit thermal gelation property, which is suitable for 3D printing of support materials. Such materials form gels upon heating and liquefy on cooling. Once done with 3D printing, the support materials fabricated with those cellulose ethers can be easily removed by cold running water or removed with external force after soaking in cold water, such as ultrasonic treatment.

In an aspect of the invention, the 3D printability can be predicted prior to 3D printing by the apparent viscosity and visco-elastic properties. This is because the 3D printability of the hydrogels prepared by cellulose derivatives is highly related to the rheological properties, which can be quantitatively measured by a rheometer.

EXAMPLES

Example 1: 3D Printing and Characterization of Hydroxypropyl Methylcellulose and Methylcellulose for Biodegradable Support Structures The three different materials of cellulose derivatives used in this example are MC A4M, HPMC E4M and HPMC K4M (J. Rettenmaier USA LP, Schoolcraft, MI). These materials are initially commercialized as thickening and gelling agents for food and pharmaceutical materials. The retail prices is approximately $6/lb. Different combinations of letters and number stand for different levels of physical properties (Table 1). The first capital letter stands for three parameters and rank in alphabetic order: dissolving and gelling temperature, and gel strength. More specifically, A4M means this material has the lowest dissolving and gelling temperature and firmest gel strength. The 4M for all three materials means their viscosity is 4×1000 mPa·s in 2% solution at 20° C. under Brookfield. The samples were prepared by mixing the powder into deionized water at 70° C. to achieve different concentrations of 8%, 10%, 12% w/v. After cooling down to room temperature (25° C.), all samples were centrifuged at 5000 rpm for 10 minutes to make homogenous hydrogels.

TABLE 1

The properties and composition of HPMC K4M, HPMC E4M, MC A4M samples.

| Material | Dissolving temperature (° C.) | Gelling temperature (° C.) | DS* (methoxyl group) % | DS (hydroxypropyl group) % |
|---|---|---|---|---|
| HPMC K4M | 25-30 | 77 | 19-24 | 4-12 |
| HPMC E4M | 20-25 | 60 | 28-30 | 7-12 |
| MC A4M | 0-5 | 49 | 27.5-31.5 | N/A |

*DS is the degree of substitution

Rheological Characterization

The study of rheological properties is critical to determine the effect of concentration on the printability and deformation of material during 3D printing. Firstly, the flow ramp test was conducted to determine the flow behavior and apparent viscosity of different materials at different concentrations. Then the yield stress and dynamic modulus were determined via the oscillatory stress sweep test. The dynamic modulus can be divided into storage modulus (G') and loss modulus (G"). The estimate of yield stress derived from oscillatory sweep stress test was fitted into the Herschel-Bulkley model to obtain the values of flow consistency (K) and flow behavior index (n).

The samples prepared were subjected to rheological tests to assess their suitability for 3D printing. These tests were performed using rotational rheometer (TA Instruments Discovery HR-2, USA) using parallel geometry plates (Peltier plate steel—110870 40 mm plate) at a gap size of 1 mm under 25° C. Before the test, the excess material between the plates was trimmed. Both flow ramp test and oscillatory stress sweep test were conducted for each sample in triplicates. Before the test, the samples were rest for 10 min between the parallels plates to achieve a steady state. To avoid evaporation, the sample and geometry plates were covered by a solvent trap.

For flow ramp test, the test parameters set as linear mode and the shear rate increased on a linear scale from 0.1 to 30 1/s. The sampling interval set as 1 second per points. Apparent viscosity ($\eta$) was calculated by dividing shear stress to shear rate, with the unit of Pa·s. The flow curves were fitted to the Herschel-Bulkley model (Equation 1) as follows:

$$\tau = \tau_0 + K\dot{\gamma}^n \qquad (1)$$

where $\tau$ means shear stress (Pa), $\tau_0$ is yield stress (Pa), $\dot{\gamma}$ is shear rate (s$^{-1}$), K is the consistency index (Pa·s$^2$), and $\eta$ is the flow behavior index. As yield stress was determined by the oscillatory stress sweep test described below, K and n were calculated with the data derived from the flow ramp test according to Equation 1.

The oscillatory stress sweep test was performed at a frequency of 0.5 Hz. The sample was subjected to increasing sweep stress of 0.1-1000 Pa and the resulting strain was recorded. When the sweep stress is below certain stress, there is a linear viscoelastic region (LVR) where the stress and strain are linearly proportional to each other and the storage modulus (G') within the LVR is constant. The endpoint of the LVR corresponding to a certain stress value is considered as the critical stress. For this study, the end of the LVR is marked by the first point where the G' dropped by 10% of the G' within the LVR, and the corresponding stress at this point is referred to as the estimate of yield stress.

Flow Ramp Test

The flow curves (FIG. 1) of MC A4M, HPMC K4M, HPMC E4M at 8%, 10%, and 12% w/v concentrations indicated shear-thinning behavior for all samples. A plot of the apparent viscosity as a function of shear rate is shown in FIG. 2. As the concentration increased, there was an increase in shear stress and apparent viscosity. The apparent viscosity decreased as the increase in shear rate. This decrease in viscosity with increased shear rate can be explained as the macromolecular network amongst the molecules were deformed or reorganized during shearing. The highest apparent viscosity was observed for 12% HPMC K4M, followed by 12% MC A4M and then 12% HPMC E4M. The standard deviations for 12% MC A4M were relatively significant than other materials. The 12% MC exhibits more solid like behavior as compared to 12% HPMC K4M and 12% HPMC E4M. Upon shearing, the 12% MC and 12% E4M formed thin films between parallel plates due to loss of moisture, making it not suitable to be tested by flow ramp test under the conditions provided. The flow curve for both MC and E4M 12% samples (FIG. 1) showed a downward trend with increased shear rate. The unexpected result was caused by these two materials were filming and some amount of them were extruded between the geometry and Peltier plate during flow ramp test.

Oscillatory Stress Sweep Test

Figure 3:
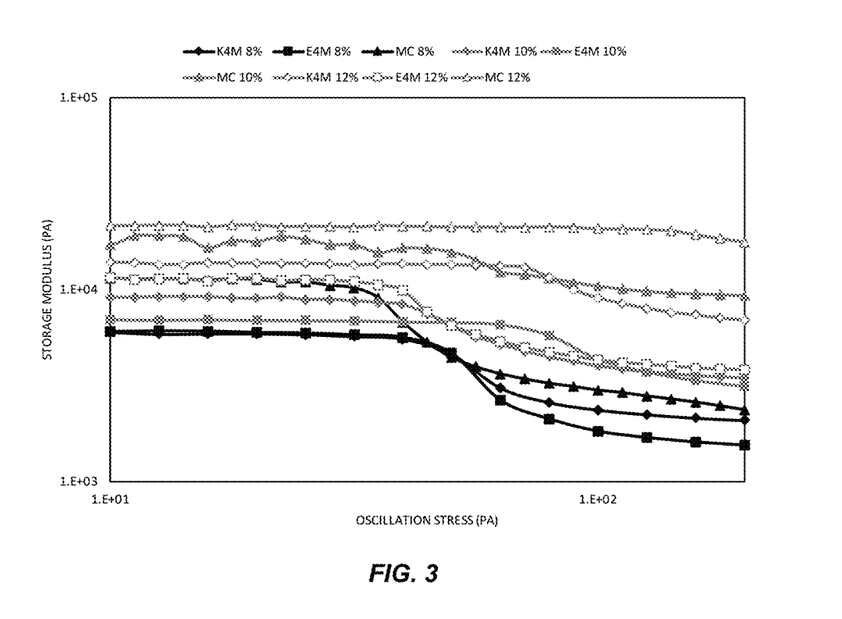
FIG. 3 shows oscillation stress versus storage modulus profiles of HPMC K4M, HPMC E4M, and MC A4M with 8%, 10%, 12% w/v at 25° C.

One purpose of the oscillatory stress sweep test is to determine the critical stress, i.e., the estimate of yield stress, using the stress value at the endpoint of LVR. Furthermore, the storage modulus is a measure of the rigidity of the sample. FIG. 3 shows the storage modulus as a function of oscillation stress for different materials at different concentrations. Storage modulus is sensitive to the change of oscillation stress and can be used as the indicator to determine when the inner structure of material starts to break down during the increase of oscillation stress.

From the graph, it shows that the critical stress increased with the increase of concentration for each material. The highest critical stress was observed for 12% MC A4M, while the lowest critical stress was 8% MC A4M, which means the material of MC A4M can reach a wide range of the critical stress values by adjusting its concentration. Before the stress reached the critical stress, the hydrogels remained three-dimensional rigid networks due to intramolecular forces, but upon the yield point, the networks between the particles were fractured and the sample started to flow. For critical storage modulus, the highest critical value was also observed for 12% MC A4M (20284.6 Pa), followed by 10% MC A4M (13429.4 Pa) and 12% HPMC K4M (13104.6 Pa). As 12% MC showed both the highest yield stress (Table 2) and storage modulus, it indicated that 12% MC is the most rigid sample and it takes the highest stress to initiate flow, thus it is expected to be the hardest to be extruded during 3D printing and it may undergo the least deformation after 3D printing. The relationship between rheological properties and extrudability/deformation of 3D printing can be further determined by investigating the printability and shape fidelity for different samples as described below.

TABLE 2

Herschel-Bulkley model parameters for the flow ramp curves of HPMC K4M, HPMC E4M, MC A4M samples.

| Material | Concentration % | Estimated $\tau_0$ (Pa) | K (Pa · s$^n$) | n |
|---|---|---|---|---|
| K4M | 8 | 37.09 | 1910.73 | 0.16 |
| | 10 | 41.81 | 4073.80 | 0.07 |
| | 12 | 45.10 | 6481.87 | 0.05 |
| E4M | 8 | 43.26 | 1060.47 | 0.27 |
| | 10 | 65.56 | 2195.33 | 0.18 |
| | 12 | 39.99 | 3836.19 | 0.11 |
| MC | 8 | 29.46 | 592.38 | 0.34 |
| | 10 | 43.05 | 1318.56 | 0.28 |
| | 12 | 95.69 | 5222.76 | 0.05 |

Figure 1:
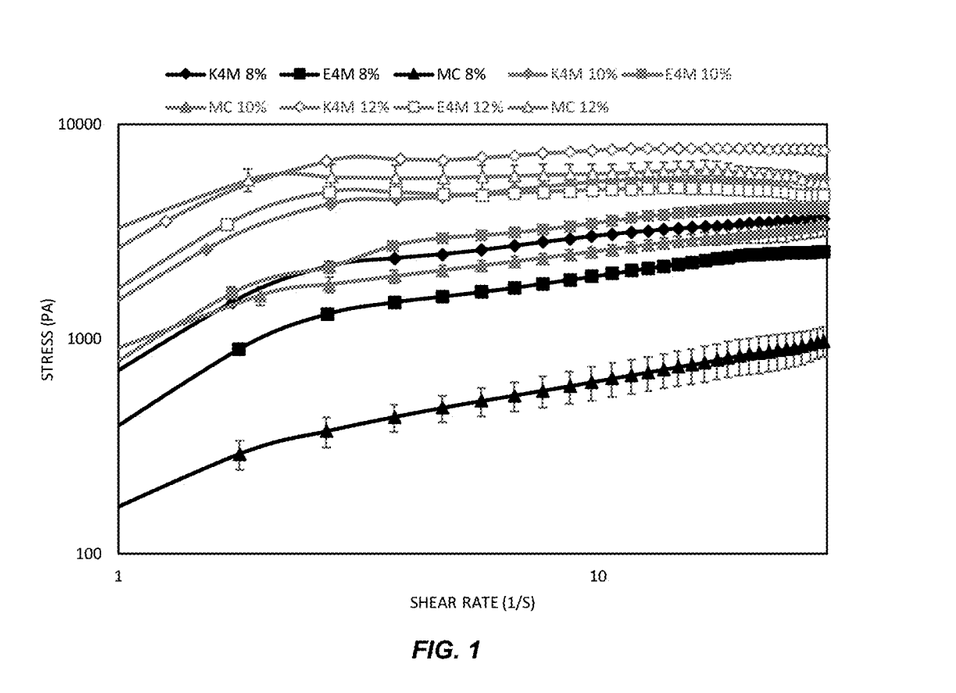
FIG. 1 shows log-transformed flow ramp curves at 25° C. of the hydrogels of HPMC K4M, HPMC E4M, and MC A4M with 8%, 10%, 12% w/v.
Figure 2:
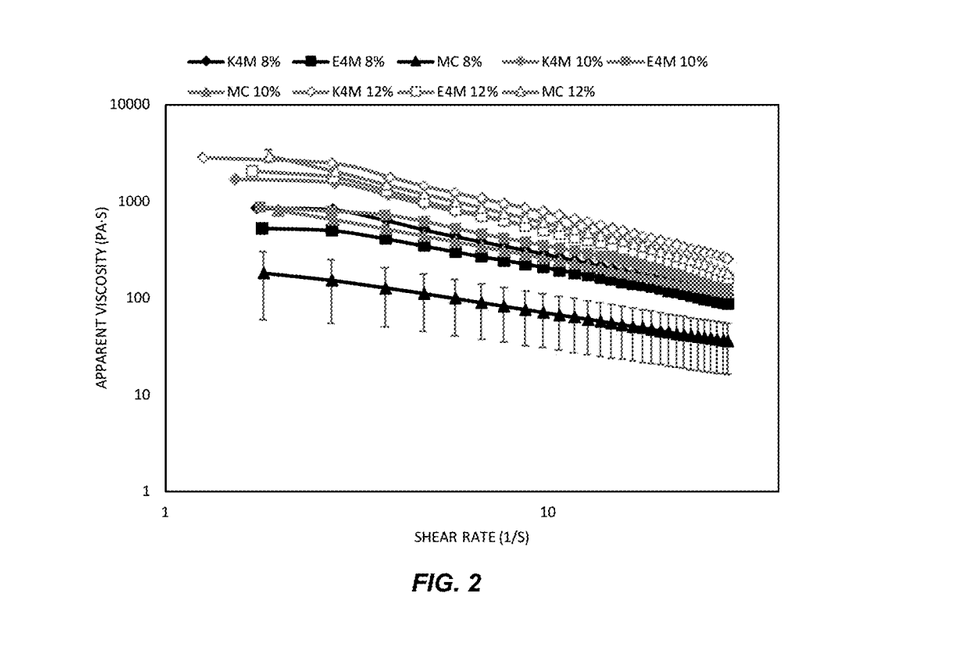
FIG. 2 shows log-transformed apparent viscosity versus shear rate profiles of HPMC K4M, HPMC E4M, and MC A4M with 8%, 10%, 12% w/v at 25° C.

Once yield stress was estimated via oscillation test, the value of flow consistency (K) and flow behavior index (n) can be derived from the Herschel-Bulkley model based on flow curves (FIG. 1). Table 2 presented the flow parameters of all samples. The yield stress, K, and n are critically determining the material rheological properties and printability performance. The flow behavior exponent less than 1 (n<1) indicates that all of these materials are shear-thinning materials (Table 2).

Based on the data, the value of yield stress and K both increased as the concentration increased. The value of n decreased as the concentration increased. In general, HPMC E4M showed the highest yield stress among the three materials at the same concentration. Besides, the n value of HPMC K4M samples is significantly smaller than the other samples at the same concentration. In this case, HPMC K4M is the most shear stable material compared with HPMC E4M and MC A4M. The lower n also means the material has more pronounced non-Newtonian flow behavior when n less than one. The higher K means the material becomes more pseudoplastic and more viscous. As seen in Table 2, the lower value of n indicated that HPMC K4M hydrogels showed more obvious non-Newtonian behavior compared with the other two materials at the same concentration. For flow consistency, the comparison of K demonstrated that HPMC K4M aqueous solutions are the most pseudoplastic and more viscous samples and MC A4M aqueous solutions are the less pseudoplastic and less viscous samples with the same concentration. When the concentration increased for each material content, the value of K increased and n deceased for all of these three materials. These results indicated that the concentration variation of these three materials significantly influences the flow behavior of the hydrogels, which may also have an influence on their extrusion during 3D printing and deformation after 3D printing.

3D Printing of MC and HPMC Based Hydrogels

Figure 4:
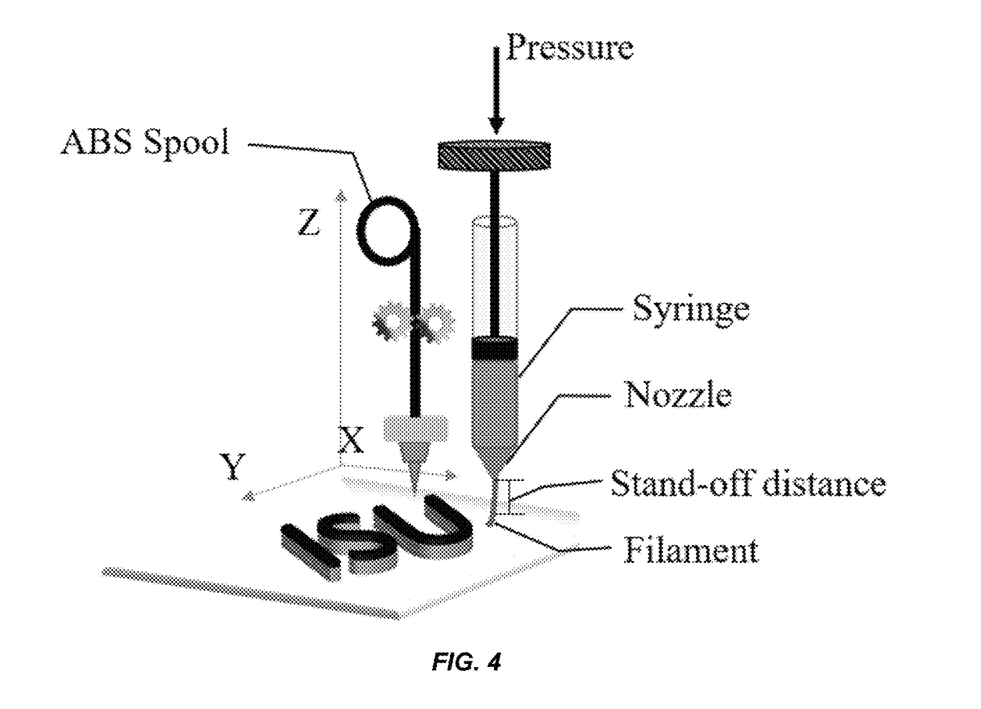
FIG. 4 is a schematic diagram of the FDM and extrusion based printer setup. The ABS spool is used to 3D print the main part, while the paste extruder filled with hydrogels is used to 3D print the supportive structure.

The customized dual-extruder 3D printer with both FDM nozzle and an extrusion-based syringe is demonstrated in FIG. 4. For the purpose of this study, only the syringe extruder is used for 3D printing the potential supportive materials. A spur gear mechanism controlled by the motor drives the piston that allows the material in the syringe to extrude to fabricate part layer-by-layer on a plate. The base plate can cover X and Y directional movements whereas the nozzle increments the height in Z-direction to print on top of each layer. The sliced part/design of the final product is fed into the 3D printer as G-Codes.

For printability, the concentration of the cellulose derivatives in the hydrogels was optimized based on dimensional accuracy. An extrusion multiplier of 0.125 and a nozzle diameter of 0.508 mm were used for all the concentration optimization experiments. Three lines were printed for with a spacing of 20 mm. The morphology of the filaments was observed using a digital camera (Canon EOS Digital Rebel T3i). The filament width was measured and calculated by digital image processing algorithms. For higher dimensional accuracy and a high-density support structure, the slumping of deposited layers was assessed in terms of shape fidelity factor. Shape fidelity factor (SFF) is the ratio of any side of the printed area to CAD model area. Shape stability was evaluated by using an image analyzer to calculate the area of the printed geometry. To assess the shape stability, three cubes with 12% concentration of HPMC K4M, HPMC E4M, and MC A4M were printed with 1 mm×1 mm×1 mm dimensions. The effect of nozzle diameter on the printed filament was analyzed. For each composition of the hydrogel, three lines having 50 mm length is deposited with six different nozzle diameters ranging from 0.437 mm to 1 mm.

Optimization of Concentration

Figure 5:
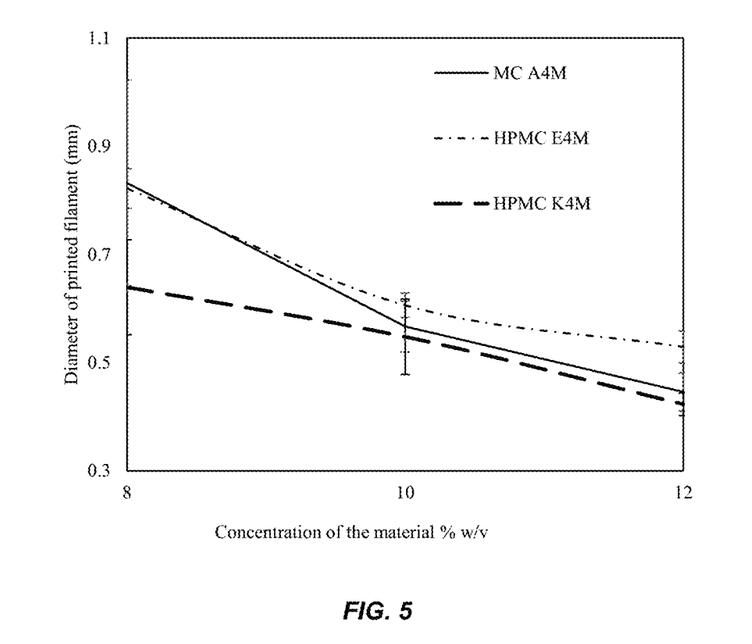
FIG. 5 shows diameter of printed filament versus concentration of the material in the aqueous solution.

An ideal hydrogel for extrusion-based 3D printing should have a sufficiently high gel strength, proper viscosity and be capable of fusing with the earlier printed layers, as well as retain the printed shape after 3D printing. Standardized methods to evaluate the printability of hydrogel is not yet established. Optimization of the concentration is significant to find the ideal condition for printing. The optimal concentration was found by printing three lines of each concentration keeping all the other printer parameters constant. The nozzle diameter chosen was 0.437 mm, printing speed of 5 mm/s and extrusion multiplier of 0.125. The three lines printed were given to the printer software in the form of G-code. The diameter of the printed filament was measured using Image analysis software. It was observed that with an increase in the concentration of the material the diameter of the filament was decreasing. This is because of the apparent viscosity increases with increase in the concentration of the material as shown in FIG. 5. The cellulose derivatives with lower concentration when printed on a surface will spread out on the surface due to the low viscosity and high flow behavior index value 'n'. The 12% w/v of all three materials had the filament diameter close to nominal nozzle diameter. The 12% w/v of all the three materials were chosen for further printability analysis as it had the least deviation from the mean.

Shape Fidelity

Figure 6:
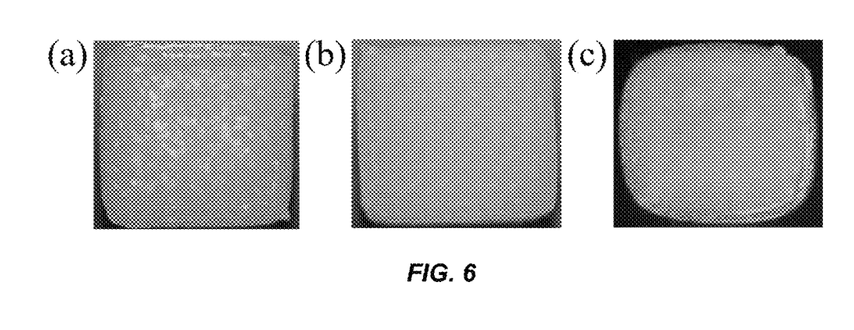
FIG. 6 shows a top view of the cube for 12% w/v concentrations for (a) HPMC K4M (b) MC A4M and (c) HPMC E4M.

Shape fidelity test quantitatively evaluates the physical deformation of the printed geometries. Higher the shape fidelity factor, lower is the ability of the material to stack up in layers, i.e., the printed part deforms after depositing few layers. This test will provide meaningful insights about the shape of the printed part after the printing process. The image of the top view of the printed cubes with 12% w/v for all three cellulose derivatives is as shown in FIG. 6. The printed area is calculated using SketchandCalc Area calculator. The scale was defined by specifying the number of pixels required for 1 mm length. The top view of the image is imported in the software. The software will detect the boundary of the image and define the number of pixels inside the boundary. The printed area is calculated based on the number of pixels and the length of each pixel. The printed area is higher for HPMC E4M compared to HPMC K4M and MC A4M. The HPMC E4M deforms while stacking up in layers. The shape fidelity factor for each cellulose derivative is given in Table 3. This deformation is because of the lower value of the storage modulus as shown in FIG. 3. Shape fidelity of geometry upon deposition is largely influenced by storage modulus. 12% w/v of MC A4M has higher storage modulus than 12% w/v of HPMC E4M, thus MC A4M has higher shape retention capacity and lower shape fidelity factor. The 12% HPMC E4M has shape fidelity factor of 1.39 indicating a large deformation of the layers, hence the 12% HPMC E4M is not suitable for printing.

TABLE 3

Shape fidelity factor based on CAD and printed shapes.

| Material (12% w/v) | CAD cross section (mm$^2$) | Printed area (mm$^2$) | Shape fidelity factor |
| --- | --- | --- | --- |
| HPMC K4M | 100 | 122 | 1.22 |
| HPMC E4M | 100 | 139 | 1.39 |
| MC A4M | 100 | 110 | 1.1 |

Effect of Nozzle Diameter on Printability

Figure 7:
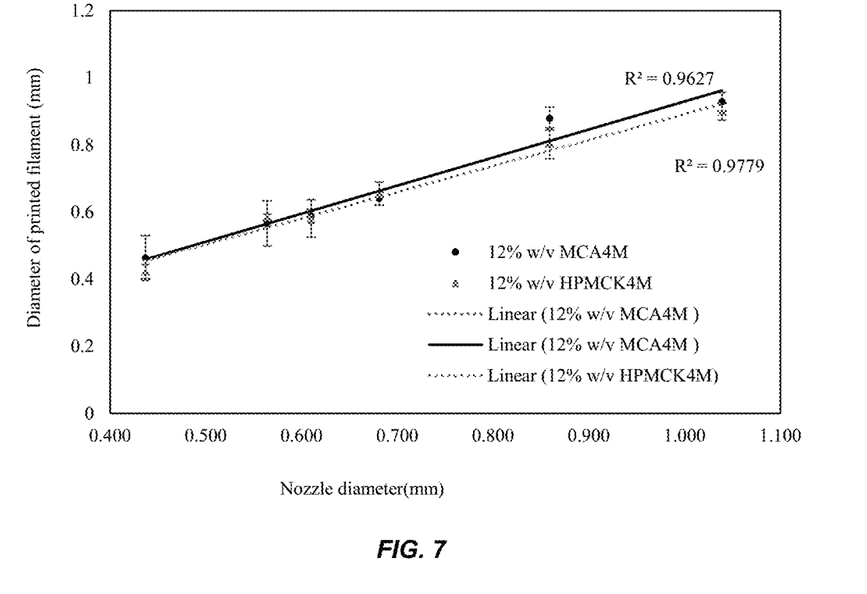
FIG. 7 shows diameter of printed filament versus nozzle diameter for 12% w/v MC A4M and HPMC K4M.

The printability of the hydrogel is not only affected by the rheological parameters and its concentration but also affected by printing parameters such as extrusion multiplier, feed rate, and nozzle diameter. In an extrusion based 3D printer, the printer parameters are optimized at which continuous filaments with a uniform diameter could be deposited. The extrusion multiplier for the printer is set at 0.125 and feed rate of 5 mm/s. The diameter of six different nozzles ranging from 0.437 mm to 1.0 mm was used to print the three lines. FIG. 7 shows the relationships between filament diameter and nozzle diameter. For both the materials 12% w/v of MC A4M and HPMC K4M, the nozzle diameter had the same effect. The diameter of printed filament decreases with the reduction in the size of the nozzle diameter. The diameter of the printed filament is proportional to the resolution of the part being printed. The increase of the nozzle diameter requires less force exerted on the syringe, so it is less possible to generate the discontinuous filaments. However, smaller the nozzle diameter better is the resolution of the printed geometry. Hence, the nozzle diameter of 0.437 mm was chosen to print the 3D objects.

Solubility Test

Figure 8:
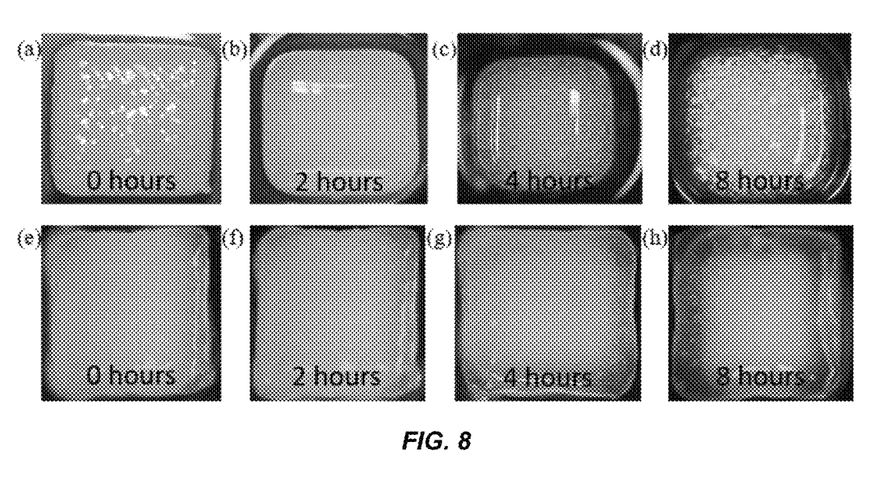
FIG. 8 shows (a-d) 12% w/v HPMC K4M and (e-h) 12% w/v MC A4M dissolved in water for 8 hours with 2-hour interval.

The solubility test assesses the dissolvability of the printed cellulose derivatives in water. It is essential to perform this test to find how easily the support material is soluble or removable from the main material. A visual inspection of the solubility test revealed the dissolvability behavior of the cellulose derivatives. Post-processing of the support structures by dissolving it in a water bath at room temperature was analyzed. Two cubes were printed for 12% w/v HPMC K4M and 12% w/v MC A4M with a nozzle diameter of 0.437 mm and feed rate of 5 mm/s. The cubes were then immersed in a water bath at 20° C. for a period of 8 hours. Images were captured at two-hour intervals to observe the phase change as shown in FIG. 8. At the end of the solubility test, both 12% w/v HPMC K4M and 12% w/v MC A4M became soft and dissolved partially into the water. This dissolution of cellulose derivatives is due to their thermal gelation property. As a result, these cellulose derivatives can be extensively used for building support structures in the solid states at ambient temperature and dissolve the support structure after printing by immersing in a cold bath at 20° C. This thermal gelation property enables easy removal of the support structures from the build materials like ABS.

3D Printed Parts

Figure 9:
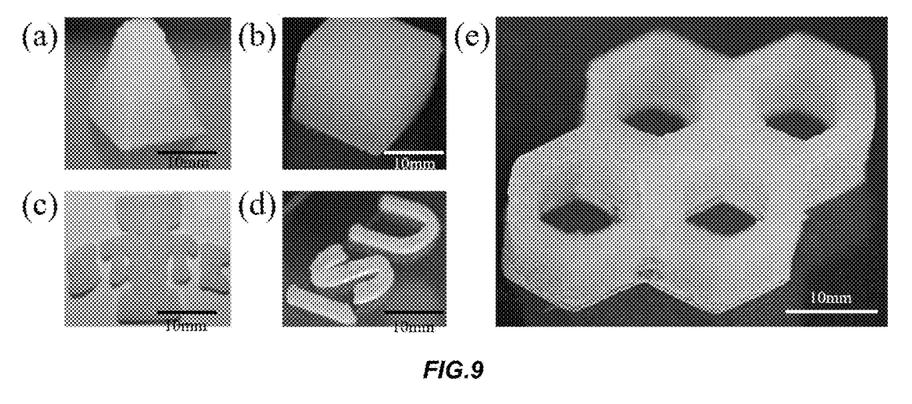
FIG. 9 shows (a) Pyramid, (c) Iowa State University logo, (d) ISU letters and (e) Honeycomb pattern printed with 12% HPMC K4M; (b) cube printed with 12% MC A4M.

Different geometries as shown in FIG. 9 were 3D printed to validate the obtained rheology and printability results. The hydrogels prepared by 12% w/v HPMC K4M and 12% w/v MC A4M were used to print the geometries at a printing speed of 5 mm/s and a nozzle diameter of 0.437 mm. All the printed geometries were at macro level. The pyramid had a base of 20 mm, a cube with 10 mm side, logo and ISU letters had 40 mm. The honeycomb pattern with each hexagon of 8 mm side was printed.

Example 2: Printability of a Cellulose Derivative for Extrusion-Based 3D Printing: The Application on a Biodegradable Support Material Currently, the field is limited by a lack of the printability test of cellulose derivatives materials which could be potentially applied as biodegradable support structure for extrusion-based 3D printing. To fill in the knowledge gap, we hypothesize the HPMC hydrogels can be 3D printed to provide mechanical support to the main structure, and then easily removed without a negative effect on the main structure quality. The aim of this example is to investigate the viscoelastic properties and mechanical strength of HPMC K4M hydrogels with different concentrations and explore the potential of using HPMC as supportive material in the application of 3D printing technology.

HPMC K4M was provided by J. Rettenmaier USA LP (Schoolcraft, MI). The degree of substitution for the methoxyl groups is 19-24%, for the hydroxypropyl groups is 4-12%. The 4M terminology indicates the viscosity of this material is in the range of 3000-5600 mPa·s in 2% solution at 20° C. under 20 rpm. The dissolving and gelling temperatures are 25-30° C. and 77° C., respectively. The aqueous solutions were prepared with 80° C. water into three different concentrations: 8%, 10%, and 12% w/v. After cooling down to ambient temperature (25° C.), all samples were centrifuged at 5000 rpm for 10 minutes to remove air bubbles.

The rheological properties test was carried out using Rheometer (TA Instruments Discovery HR-2, USA) with parallel geometry plates at a gap size of 1 mm under ambient temperature. The flow ramp test was conducted to determine the apparent viscosity under the increased shear rate (0.1 to 100 l/s). The apparent viscosity was measured and plotted as a function of the shear rate. The oscillatory frequency sweep test was used to characterize the materials' dynamic modulus with sweep strain increased from 1 to 100%. The rheological properties, i.e., shear rate, apparent viscosity, angular frequency, storage modulus (G'), loss modulus (G"), and loss tangent (tan $\delta$=G"/G'), were recorded by the Trios Software (TA Instruments, USA). All rheological properties tests were conducted in triplicates.

The printability test was conducted using the extrusion-based syringe that was configured on the platform of the Velleman K8200 3D printer (Velleman Inc., Fort Worth, Texas). The test was designed to print geometries with different fill-in patterns, i.e., rectilinear and Hilbert curve, and densities (100, 75, and 50%). The printer settings were as follows: speed was 5 mm/s, nozzle diameter was 0.437 mm, extrusion multilayer was 0.05, print under ambient temperature, and the number of layers was twelve. To study the morphology and the pore structure of the printed objects, the freeze-dried HPMC K4M 12% sample (100% fill-in density with rectilinear pattern) was coated with gold (SBC-12 Sputter coater) to improve the conductivity. The SEM images were observed on JEOL (JCM-6000). The average pore size (width and length) of K4M12% object's surface was acquired by measuring 5 pores with image J software (version Java 1.8.0).

Figure 10:
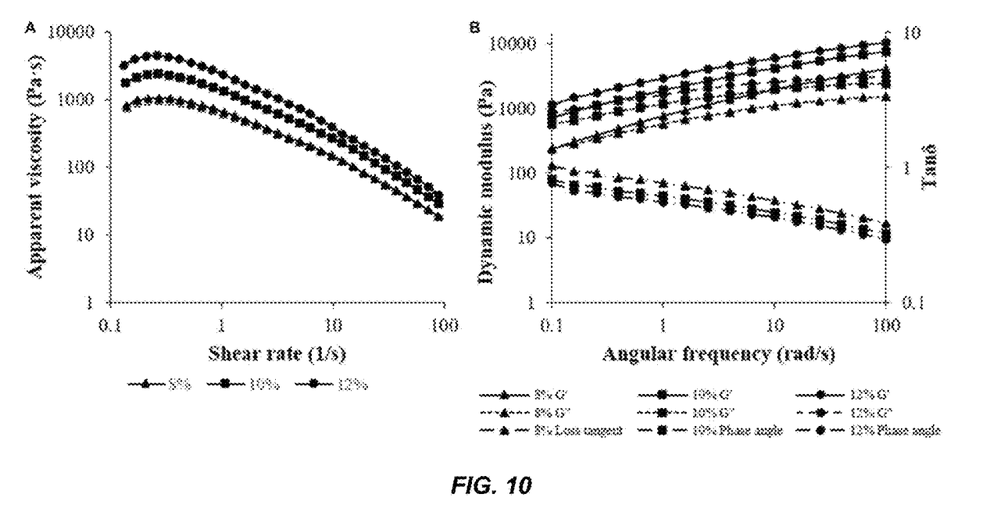
FIG. 10 shows (A) flow ramp test data: apparent viscosity versus shear rate profiles; (B) Frequency sweep test data: dynamic modulus and loss tangent versus angular frequency profiles of HPMC K4M under different concentrations (8, 10, 12% w/v).

As shown in FIG. 10A, the apparent viscosity of all the materials decreased as the shear rate increased, which means the materials behave as shear-thinning fluids. The property of shear stress-dependent viscosity makes the HPMC gel printable through the extrusion-based printer once the applied stress exceeds the yield stress. Then the printed filament showed the shape retention ability that is associated with the high apparent viscosity after extrusion. The G' and G" are functions of frequency, and both gradually increased with the increasing oscillatory frequency, as shown in FIG. 10B. The G' and G" used to describe the magnitude of energy stored and lost per cycle of deformation. Under the same concentration, G' is higher than G" which indicated the deformation through this material is permanently elastic or recoverable. When the concentration increased, both G' and G" increased, which indicated the strength of the material network structure increased, and the material behaved more solid-like. The reason is the increased concentration of HPMC brings stronger intermolecular hydrogen bonding. The G' for HPMC gel increased when the formation of the gel network was more completed, and the dense network structure contributed to the stronger gel strength. The decreased G' of materials improved the flowability when extruding from the syringe nozzle, but it is not helpful for the shape retention ability.

The loss tangent values for all three different concentrations are less than 1, which means the materials have predominant solid-like behavior. The loss tangent decreased as HPMC K4M concentration increased, which indicated the G' become dominant, i.e., materials showed more solid-like behavior due to water content decreased (Liu et al., 2018). Gao et al. (2019) claimed that the gelatin-alginate composite hydrogels showed optimal compromise between structural integrity and extrusion uniformity with a tan δ in the range of 0.25 to 0.45. According to the rheological properties of HPMC hydrogel, the increased concentration made the value of tan δ fall into this critical range under relatively lower angular frequency. In general, the rheological properties of HPMC K4M demonstrated concentration played a significant role in the mechanical strength of printed filaments. The highest concentration, 12% w/v HPMC K4M hydrogel, showed the highest G' (3072 Pa) and lowest loss tangent (0.55) at 1 rad/s.

For shear-thinning materials, it has been reported that increasing the material concentration could conducive to the resolution of printed objects. Because the increased content of HPMC polymer brings more available interaction sites to form hydrogen bonding which led to resolution improvement. Meanwhile, the filament diameter during the printing process also decreased as HPMC hydrogel concentration increased, which also enhanced the resolution of printed objects and inhibited the extrude swell or die swell phenomenon. The 12% w/v HPMC hydrogel showed the highest G' value, which should exhibit the lowest shape fidelity factor correspondingly, i.e., the printed filaments could stack up in layers without sagging or deformation. In this case, the 12% w/v HPMC hydrogel had been selected to do the printability test due to the optimal shape retention ability and buildability. According to the previous study, when compared with other nozzles with different diameters ranging from 0.437 mm to 1.0 mm, the smallest one showed the smallest diameter of printed filaments which subsequently improved the geometries' resolution. As a result, the nozzle with 0.437 mm diameter was chosen to print the objects for the printability test because of the desired resolution and surface quality.

Figure 11:
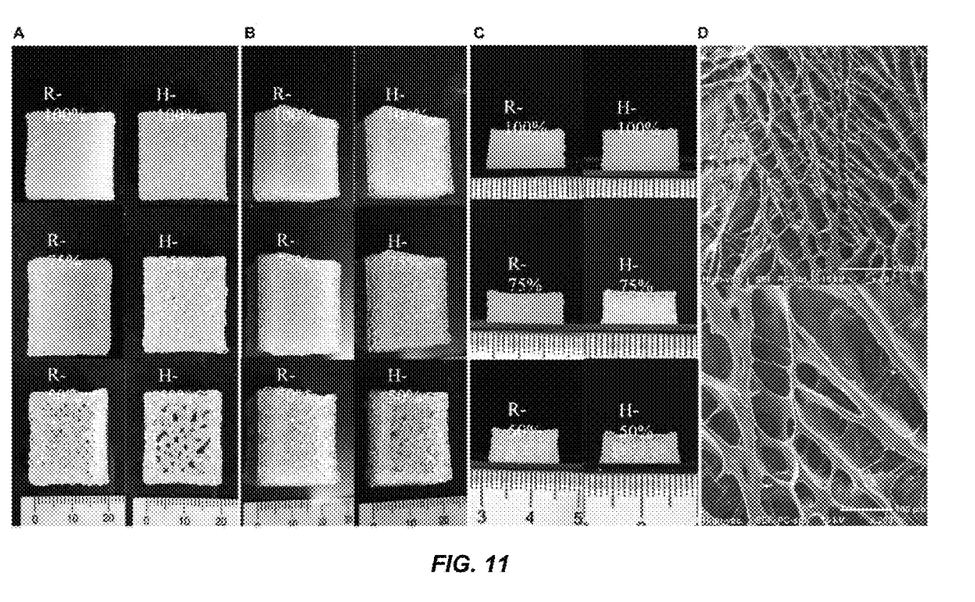
FIG. 11 shows HPMC K4M 12% w/v printed geometries with different fill-in patterns (R means rectilinear fill-in patterns and H means Hilbert curve fill-in patterns) and densities (100, 75, 50%). (A) Top view; (B) Side view; (C) Front view; (D) SEM micrographs of HPMC K4M12% (R-100%).

The rectilinear pattern makes the printer nozzle move into simple parallel lines at a 45° angle. Not like the clear surface of the rectilinear pattern, the geometries filled in with the Hilbert curve pattern showed less straight and distinct peripheral lines (FIG. 11 A, B, C). The main reason may be the short traveling distance of the nozzle caused the printed filaments to have less tensile strength (Fafenrot et al., 2017; Akhoundi and Behravesh, 2019). The nozzle could be moved more smoothly through the x and y direction when using a rectilinear fill-in pattern. Besides, the printing process of the Hilbert curve pattern took a remarkably long time to fill in the printed geometries. FIG. 11D showed the surface of extruded K4M12% filaments was porous with uneven oblong shape pores. The average length and width of the pores are 267 μm and 173 μm, respectively. These microscale pores have composed a net structure of K4M hydrogel which contained high water content before sublimation. When mixing with the water over gelling temperature, the power-like K4M material firstly dissolved into solvent as a liquid then converted into a semi-solid state as a hydrogel. The gelation formed as the self-aggregation between methyl groups and water because of the relative hydrophobic property. The aggregation is expedited by increased temperature which promotes the formation of hydrogen bonds. The hydrophobic interaction induced the gelation of the HPMC solution and resulted in a three-dimensional network as evidenced in FIG. 11D. The porous network structure also showed the potential of the application for pharmaceutical purposes, because the cross-linked net structure may work as a micro-scale barrier to control the active pharmaceutical ingredients release profile from HPMC based hydrogel matrix.

For the rectilinear pattern, the 50% fill density geometry showed uneven surface and twisted filaments compared with other densities. The reason may be the lower density left more space for printed material to fill in. The Hilbert curve developed much higher porosity than the rectilinear pattern under the same level of density. The high porosity should favor the penetration rate of gas or liquid in future applications.

Figure 12:
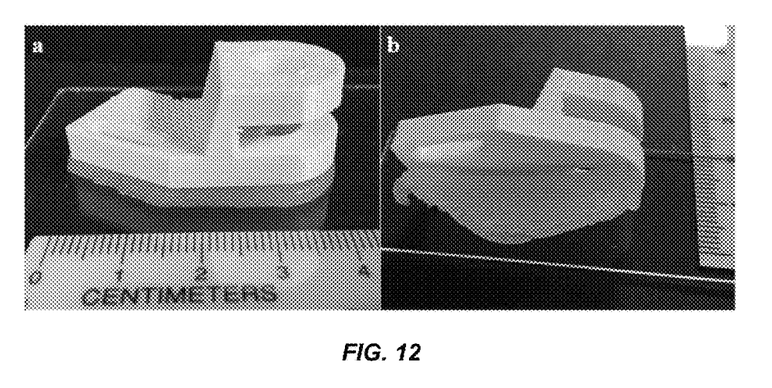
FIG. 12 shows K4M 12% w/v based support structure attached with ABS based main structure. Fig. (a) demonstrates the 3D printed supportive structure (HPMC) and the main structure (ABS) hold together; (b) the HPMC supportive structure can be thoroughly peeled off from the main structure without visible residual.

FIG. 12 showed the combination between the 12% w/v K4M based support structure and the main structure made of ABS. The support structure was sticky and provided excellent adhesiveness to attach the surface of ABS. These two printed parts could hold together and are supposed to provide high integrity and stability during the printing process. Also, the K4M supportive structure can be thoroughly peeled off from the main structure without visible residual. According to the rheological properties, K4M 12% w/v hydrogel showed the best shape retention ability. The relatively high G' of this concentration also denotes more solid-like property and higher mechanical rigidity.

The inventions being thus described, it will be obvious that the same may be varied in many ways. Such variations are not to be regarded as a departure from the spirit and scope of the inventions. Since many embodiments can be made without departing from the spirit and scope of the invention, the invention resides in the claims.

What is claimed is:

1. A method of forming a three-dimensional object, the method comprising:
   printing a support structure from a support material, wherein the support material comprises a hydrogel of a cellulose derivative, wherein the cellulose derivative comprises hydroxypropyl methylcellulose.

2. The method of claim 1, wherein the support structure is biodegradable.

3. The method of claim 1, wherein the hydrogel is removable by dissolving in water.

4. The method of claim 1, wherein the hydrogel comprises from about 8% w/v to about 12% w/v of the cellulose derivative.

5. The method of claim 1, wherein the degree of substitution of hydroxyl groups of the cellulose derivative is from about 20% to about 50%.

6. The method of claim 1, further comprising:
   printing a main structure from a build material on the support structure; and
   removing the main structure from the support structure.

7. The method of claim 6, wherein the removing comprises contacting the support structure with water.

8. The method of claim 7, wherein the water is at a temperature of about 20° C.

9. The method of claim 6, wherein the removing does not generate toxic waste or hazardous fumes.

10. The method of claim 1, wherein the printing comprises use of fused deposition modeling or material extrusion.

11. The method of claim 1, wherein the printing comprises dispensing the support material through a nozzle, and wherein the nozzle has a diameter of from about 0.4 mm to about 1.0 mm.

12. The method of claim 1, wherein the hydrogel is prepared by a method comprising:

mixing the cellulose derivative with water to form a cellulose derivative mixture;

heating the mixture to about 70° C.; and cooling the mixture to about 25° C.

13. A three-dimensional object comprising:
a support structure formed from a support material, wherein the support material comprises a hydrogel of a cellulose derivative, wherein the cellulose derivative comprises hydroxypropyl methylcellulose; and wherein the hydrogel comprises from about 8% w/v to about 12% w/v of the cellulose derivative.

14. The three-dimensional object of claim 13, wherein the support structure is biodegradable.

15. The three-dimensional object of claim 13, wherein the cellulose derivative is water-soluble.

16. The three-dimensional object of claim 13, wherein the degree of substitution of hydroxyl groups of the cellulose derivative is from about 20% to about 50%.

17. The three-dimensional object of claim 13, further comprising a main structure, wherein the main structure is removable from support structure by contacting the support structure with water.

18. The three-dimensional object of claim 17, wherein the removal does not generate toxic waste or hazardous fumes.

\* \* \* \* \*